(12) United States Patent
Pryde

(10) Patent No.: US 11,487,876 B1
(45) Date of Patent: Nov. 1, 2022

(54) ROBUST WHITELISTING OF LEGITIMATE FILES USING SIMILARITY SCORE AND SUSPICIOUSNESS SCORE

(71) Applicant: Trend Micro Inc., Tokyo (JP)

(72) Inventor: Jayson Pryde, Pasig (PH)

(73) Assignee: Trend Micro Inc., Tokyo (JP)

( * ) Notice: Subject to any disclaimer, the term of this patent is extended or adjusted under 35 U.S.C. 154(b) by 268 days.

(21) Appl. No.: 16/841,025

(22) Filed: Apr. 6, 2020

(51) Int. Cl.
| | |
|---|---|
| *G06F 21/56* | (2013.01) |
| *H04L 9/40* | (2022.01) |
| *G06K 9/62* | (2022.01) |

(52) U.S. Cl.
CPC ........... *G06F 21/56* (2013.01); *G06K 9/6221* (2013.01); *H04L 63/101* (2013.01); *H04L 63/1433* (2013.01); *G06F 2221/2141* (2013.01)

(58) Field of Classification Search
CPC ............. G06F 21/56; G06F 2221/2141; G06F 21/564; G06F 21/565; G06F 21/567; G06K 9/6221; H04L 63/101; H04L 63/1433; H04L 63/1416
See application file for complete search history.

(56) References Cited

U.S. PATENT DOCUMENTS

| | | | |
|---|---|---|---|
| 8,205,258 B1 | 6/2012 | Chang et al. | |
| 8,769,683 B1 | 7/2014 | Oliver | |
| 8,925,087 B1 | 12/2014 | Oliver et al. | |
| 9,237,161 B2* | 1/2016 | Humble | .............. H04L 63/1408 |
| 9,361,458 B1 | 6/2016 | Feng et al. | |
| 9,916,448 B1 | 3/2018 | Zhang et al. | |
| 9,998,484 B1* | 6/2018 | Buyukkayhan | ....... G06F 21/567 |
| 10,089,467 B1* | 10/2018 | Hartnett | ................. G06N 20/00 |
| 10,162,967 B1 | 12/2018 | Oliver et al. | |
| 10,437,996 B1* | 10/2019 | Li | .......................... G06F 16/245 |
| 10,754,950 B2* | 8/2020 | Scofield | ................... G06F 21/53 |
| 11,184,379 B1* | 11/2021 | Kjar | ...................... G06F 21/565 |
| 2013/0111591 A1* | 5/2013 | Topan | ................... G06F 21/563 726/24 |
| 2013/0340077 A1* | 12/2013 | Salsamendi | .......... G06F 21/554 718/1 |

(Continued)

OTHER PUBLICATIONS

U.S. Appl. No. 16/430,758, filed Jun. 4, 2019.

(Continued)

*Primary Examiner* — Daniel B Potratz
*Assistant Examiner* — Matthias Habtegeorgis
(74) *Attorney, Agent, or Firm* — Beyer Law Group LLP

(57) ABSTRACT

A locality-sensitive hash value is calculated for a suspect file in an endpoint computer. A similarity score is calculated for the suspect hash value by comparing it to similarly-calculated hash values in a cluster of known benign files. A suspiciousness score is calculated for the suspect hash value based upon similar matches in a cluster of benign files and a cluster of known malicious files. These similarity score and the suspiciousness score or combined in order to determine if the suspect file is malicious or not. Feature extraction and a set of features for the suspect file may be used instead of the hash value; the classes would contain sets of features rather than hash values. The clusters may reside in a cloud service database. The suspiciousness score is a modified Tarantula technique. Matching of locality-sensitive hashes may be performed by traversing tree structures of hash values.

21 Claims, 10 Drawing Sheets

(56) References Cited

U.S. PATENT DOCUMENTS

2020/0311414 A1* 10/2020 Enuka .................. G06V 30/418

OTHER PUBLICATIONS

Ian Kenefick, U.S. Appl. No. 16/787,204, filed Feb. 11, 2020.
Yin-Ming Chang et al., U.S. Appl. No. 16/811,651, filed Mar. 6, 2020.
SBT Tarantula, A Brief Overview of Fault Localization.
An Evaluation of Similarity Coefficients for Software Fault Localization, Jan. 2007.
Empirical Evaluation of the Tarantula Automatic Fault Localization Technique, James A. Jones and Mary Jean Harrol, Nov. 7-11, 2005.

* cited by examiner

System Implementation on an Endpoint Computer

210

$$hue(S) = \frac{\dfrac{passed(S)}{total\ passed}}{\dfrac{passed(S)}{total\ passed} + \dfrac{failed(S)}{total\ failed}}$$

220 — $suspiciousness(S) = 1 - hue(S)$

$$hue(F) = \frac{\dfrac{\text{Total benign files matched}\ \text{— 231}}{\text{Total of cluster items in the matched benign clusters}\ \text{— 232}}}{\underset{253}{\underbrace{\dfrac{\text{Total benign files matched}}{\underset{234}{\underbrace{\text{Total of cluster items in the matched benign clusters}}}}}} + \underset{255}{\underbrace{\dfrac{\text{Total malware matched}}{\underset{256}{\underbrace{\text{Total of cluster items in the matched malware clusters}}}}}}}$$

240 — $suspiciousness(F) = 1 - hue(F)$

FIG. 3

610 → $\text{hue}(F) = \dfrac{\dfrac{5}{6}}{\dfrac{5}{6} + \dfrac{1}{18}} = 0.9375$ 620 → suspiciousness = 1 − hue = 1 − 0.9375 = 0.0625

FIG. 6

710 → $\text{hue}(F) = \dfrac{\dfrac{1}{15}}{\dfrac{1}{15} + \dfrac{4}{6}} = 0.0909$ 720 → suspiciousness = 1 − hue = 1 − 0.0909 = 0.9091

FIG. 7

Algorithm 1 *SplitMethod(N)*

$nitems \leftarrow size(N.data)$
    if *nitems* < *nitemsInLeaf* then
        return *NULL*
    else
        $Y \leftarrow$ random element of N.*data*
        Find threshold($T$) s.t. $size(X1) \approx size(X2)$ where
            $X1 \leftarrow \{xi \quad N.data : Dist(xi, Y) \leq T\}$
            $X2 \leftarrow \{xi \quad N.data : Dist(xi, Y) > T\}$
        return $(Y, T, X1, X2)$;
    end if

Algorithm 2 *TreeBuild(N)*

$Res \leftarrow SplitMethod(N)$
    if $Res \neq NULL$ then
        $(Y, T, X1, X2) = Res$
        $N.Split \leftarrow Y$
        $N.Threshold \leftarrow T$
        $N.LC.data \leftarrow X1$
        $TreeBuild(N.LC)$
        $N.RC.data \leftarrow X2$
        $TreeBuild(N.RC)$
    end if

Tree Building Algorithms

*FIG. 9*

ROBUST WHITELISTING OF LEGITIMATE FILES USING SIMILARITY SCORE AND SUSPICIOUSNESS SCORE

FIELD OF THE INVENTION

The present invention relates generally to adding files to a white list. More specifically, the present invention relates to using a locality-sensitive hash function and a modified Tarantula technique.

BACKGROUND OF THE INVENTION

Because of the rapid evolution and release of new or modified malicious software (malware) in the wild, keeping up with malware detection and prevention has been a very tedious task. This rapid evolution has been brought on by several factors such as: advancements in information technology infrastructure, new open source frameworks and tools, and developments in algorithms that may be used for evasion (e.g., packer technology). This rapid evolution is also the primary reason why whitelisting technology has been considered as one of the bright lights in the cyber security industry when it comes to detection and prevention. By simply following a basic and old school concept of maintaining an approved whitelist of applications, files, etc., which are allowed to run in a computer system, execution of malicious or suspicious files will likely be prevented and thus, potential malware attacks will be blocked.

The same three factors mentioned above pushing the malware evolution are also factors affecting the world of legitimate software applications. Because of the advancements in IT infrastructure (i.e., movement of files to the cloud) along with several open source frameworks, legitimate software distributions and releases are occurring very frequently. With nightly (or even hourly) builds and releases of software distributions, keeping up with new versions and patches of legitimate software has become a headache in terms of maintaining and updating any whitelist platforms. This maintaining and updating of whitelist platforms is a primary problem for IT administrators, almost making whitelisting not a viable solution to prevent and detect malware.

One effective solution is the utilization of one-to-many technology via similarity digests. Taking TLSH, which is a similarity digest, as an example, an IT administrator need not be on top of every version or patch release for applications in the approved whitelist, since a new version or patch will be very similar to the original application (indicated by a low similarity score), unless a new version has been modified to be different from the previous version.

Thus, similarity digests are able to handle the primary whitelisting headache of IT administrators. Use of these digests, however, opens up a second problem with regard to risk from malware. That is, use of similarity digests may allow malware to execute in a computer system, if the malware can be made similar to a legitimate file. Though this may be challenging to do, with the craftiness of malware writers these days, such a task is surely possible.

Therefore, techniques to create a more robust whitelisting application using similarity digests are desired.

SUMMARY OF THE INVENTION

To achieve the foregoing, and in accordance with the purpose of the present invention, a hybrid technique is disclosed that makes use of both a similarity score and a suspiciousness score. In particular, robust whitelisting of legitimate files combines locality-sensitive hashing (using a similarity score) and a modified Tarantula similarity-based technique (using a suspiciousness score) in order to whitelist appropriate files. Files that are deemed malicious are not put on a whitelist, may not be executed, and may be removed from an endpoint computer. Benign files are allowed to be executed on the endpoint computer.

In a first embodiment, a locality-sensitive hashing algorithm is used to calculate a hash value for a suspect file in an endpoint computer. This hash value is matched against hash values in clusters of benign files in order to calculate a similarity score for the suspect file. A suspiciousness score is also calculated for the suspect file which depends upon the total number of benign files matched, the total number of malicious files matched, and the total number of files in both the benign and the malicious clusters that were matched. A determination is made that the suspect file is benign based on a combination of the similarity score and the suspiciousness score.

In a second embodiment, a locality-sensitive hashing algorithm is used to calculate a hash value for a suspect file in an endpoint computer. This hash value is matched against hash values in clusters of benign files in order to calculate a similarity score for the suspect file. A suspiciousness score is also calculated for the suspect file which depends upon the total number of benign files matched, the total number of malicious files matched, and the total number of files in both the benign and the malicious clusters that were matched. A determination is made that the suspect file is malicious based on a combination of the similarity score and the suspiciousness score.

In a third embodiment, a machine learning feature extraction algorithm is used to extract a set of features for a suspect file in an endpoint computer. These features are matched against similarly obtained sets of features in a cluster of benign files in order to calculate a similarity score for the suspect file. A suspiciousness score is also calculated for the suspect file which depends upon the total number of benign files matched, the total number of malicious files matched, and the total number of files in both the benign and the malicious clusters that were matched. A determination is made that the suspect file is benign based on a combination of the similarity score and the suspiciousness score.

The invention may be used as an end-point whitelisting product, utilizing a similarity digest and similarity-based techniques as its foundation. In particular, it can complement an existing implementation of Trend Micro's End-point Application Control product. In addition, the invention may be used as a service available in the cloud.

BRIEF DESCRIPTION OF THE DRAWINGS

The invention, together with further advantages thereof, may best be understood by reference to the following description taken in conjunction with the accompanying drawings in which:

FIG. 2 shows how Tarantula calculates a hue score and then a suspiciousness score.

FIG. 3 shows how our system calculates a hue score and then a suspiciousness score using matching of a hash value (or features) for a suspect file.

FIG. 6 shows a score calculation based on this example.

FIG. 7 shows a score calculation based upon yet another example.

FIG. 9 shows tree building algorithms 1 and 2 used to build normal forest and malware forest.

DETAILED DESCRIPTION OF THE INVENTION

Above, it is noted that use of similarity digests may allow malware to execute in a computer system, if the malware can be made similar to a legitimate file. A simple example would be modifying an old version of a legitimate file to contain malicious code. With respect to using locality-sensitive hashing for whitelisting, U.S. Pat. No. 10,162,967 entitled "Methods and Systems for Identifying Legitimate Computer Files" discloses coverage strength of the TLSH algorithm (and is hereby incorporated by reference), but it does not discuss suspiciousness. U.S. application No. 16/430,758 filed Jun. 4, 2019 also provides details on the TLSH algorithm, and is hereby incorporated by reference. U.S. Pat. Nos. 8,769,683, 8,205,258, 9,361,458, 10,162,967, 8,925,087 and 9,916,448 also disclose use of the TLSH algorithm and each is hereby incorporated by reference.

U.S. application Nos. 16/787,204 and 16/811,651 discuss use of similarity digests and are also hereby incorporated by reference. With respect to the Tarantula similarity-based technique, mentioned above, the applications of this technique are in the field of auto-debugging processes for software development; application of this method to whitelisting technology has not been done before.

In order to address the two major problems with whitelisting technology discussed above, the invention combines the one-to-many strength of similarity digests (which use a similarity score) with a modified Tarantula method (which is a similarity-based fault-localization technique used for automated debugging during software development) which uses a suspiciousness score. In particular, the Trend Micro locality-sensitive hash (TLSH) function may be used. Given TLSH's effectiveness and accuracy in identifying similar files, new application versions and patches will very likely be covered in the approved whitelist using just one (or a few) hash entries in the whitelist for a particular application.

System Diagram

Figure 1A:
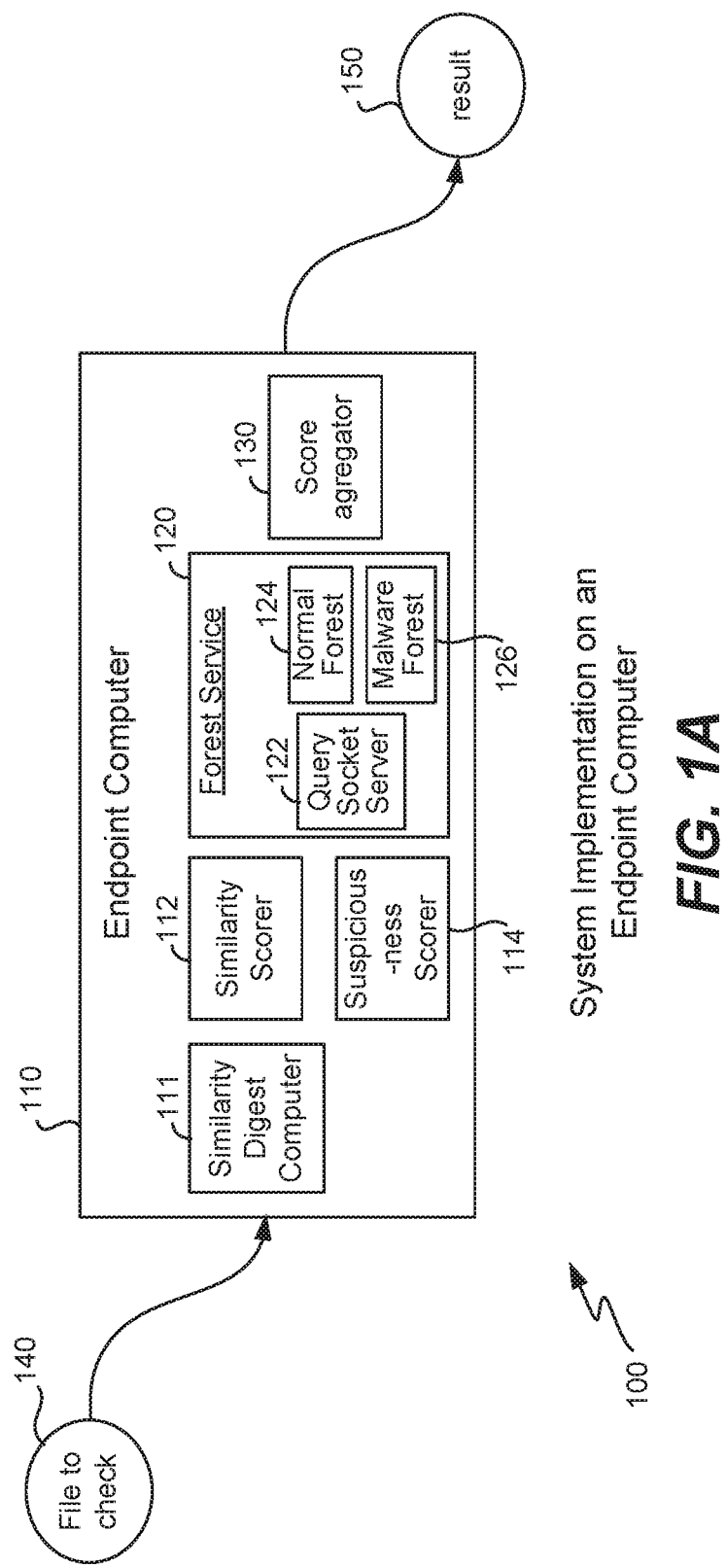
FIG. 1A is a system showing an input file to check, an endpoint user computer and an output result, where all calculations happen on the endpoint computer.
Figure 1B:
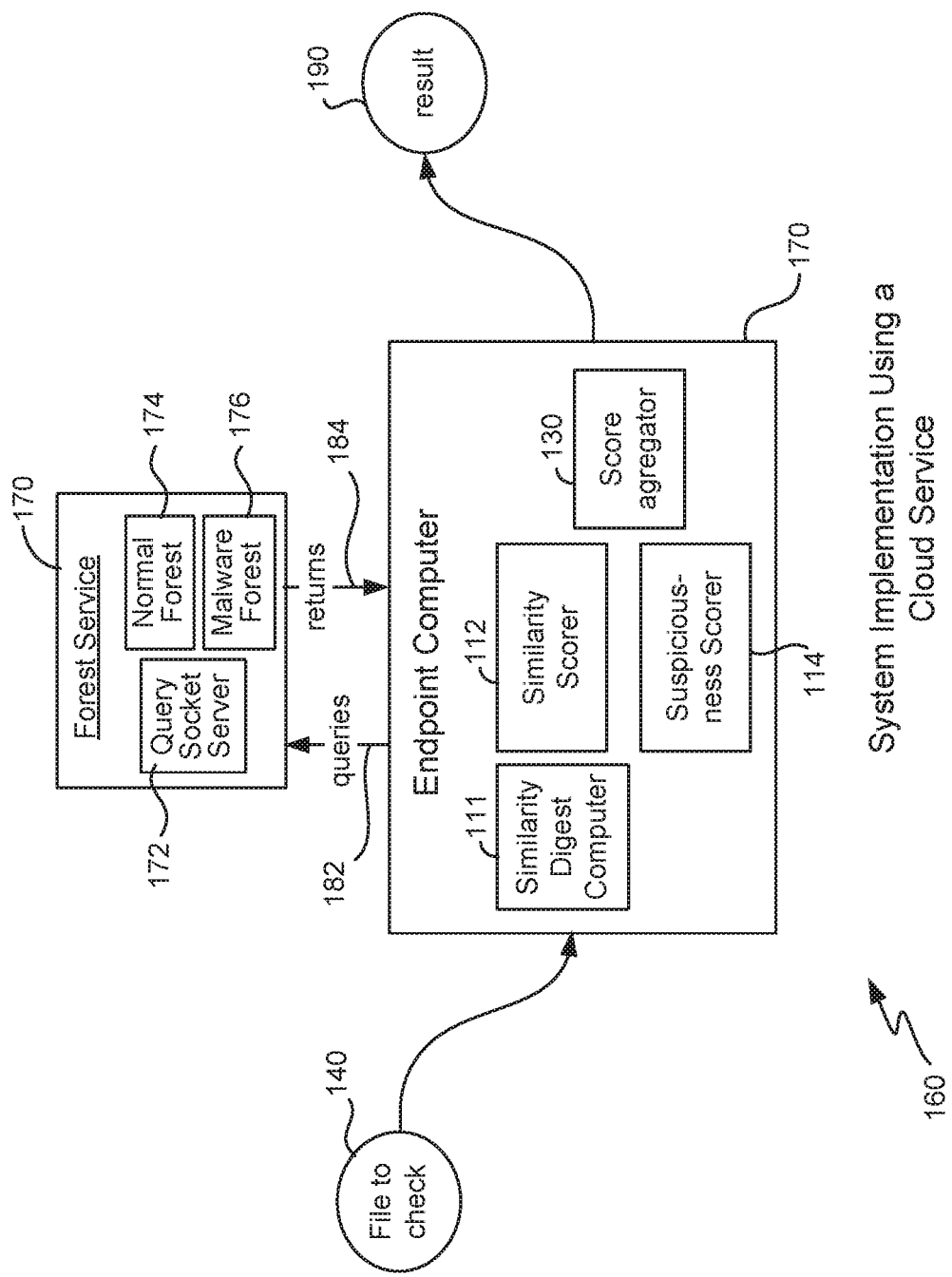
FIG. 1B is a system showing an input file to check, an endpoint user computer and an output result, where the forest service is implemented in the cloud.
Figure 1C:
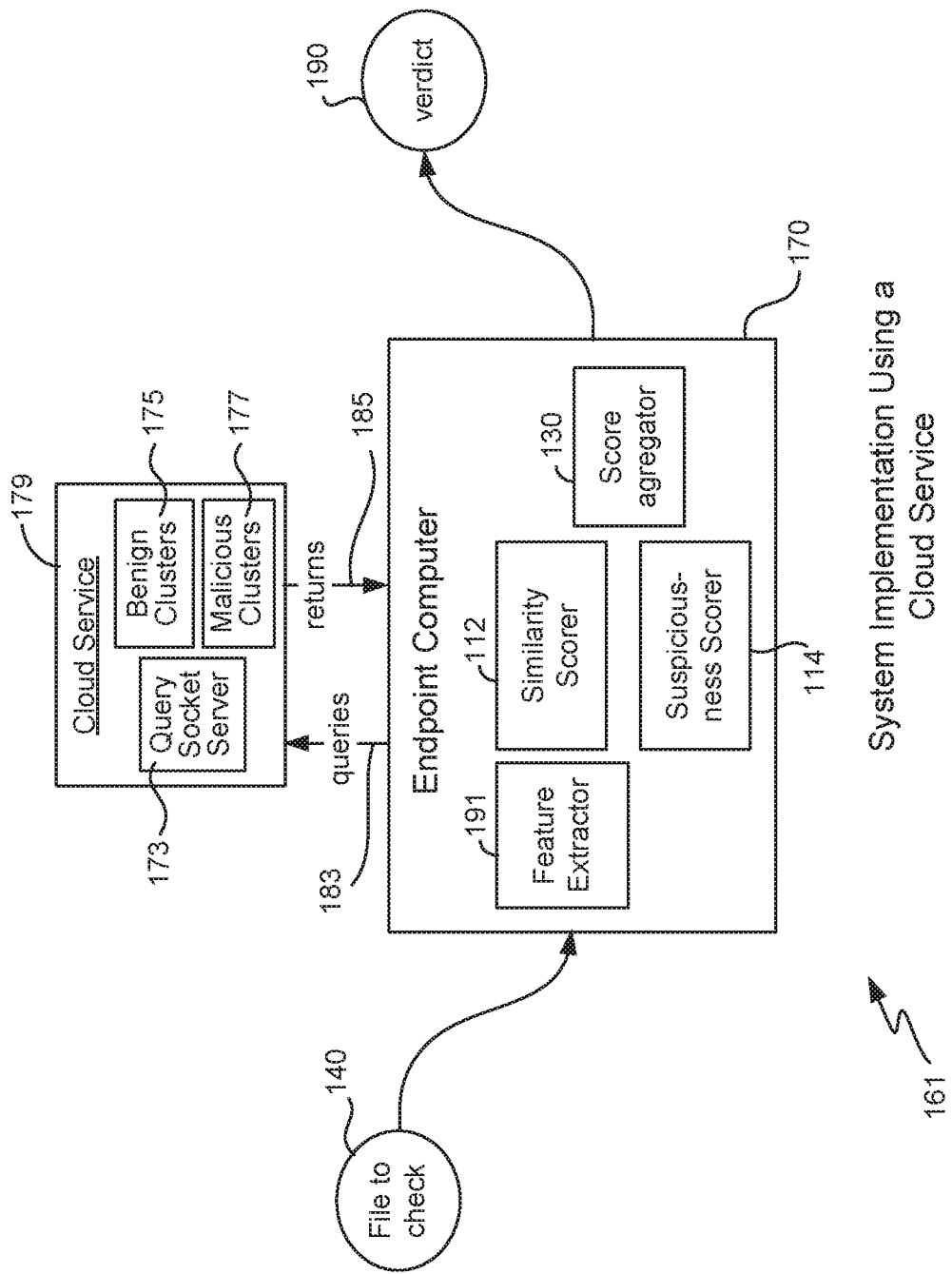
FIG. 1C is a system showing an input file to check, an endpoint user computer and an output result, where a cloud service implements feature comparison.

FIGS. 1A, 1B and 1C are block diagrams of systems that may be used to implement the present invention. FIG. 1A is a system 100 showing an input file to check 140, an endpoint user computer 110 and an output result 150. In this embodiment, all calculations and databases are present on the endpoint computer. File 140 may be any suitable file present on or input to the computer such as those mentioned before, including a new version of an operating system file, a new patch, a downloaded file, a file received via an e-mail attachment, etc., and may be any file type such as PDF, a portable executable, document, spreadsheet, etc. Endpoint computer 110 is any suitable user computer such as a desktop, laptop, etc. The computer includes software modules for implementing the present invention such as a similarity digest computer module 111 (for calculating TLSH values and other similarity digests), similarity scorer engine 112, a suspiciousness scorer engine 114 and a score aggregator engine 130. Forest service 120 is one embodiment which uses the TLSH algorithm which includes a collection of databases such as normal forest 124 and malware forest 126.

Further details are provided below in step 512. Query socket server 122 is software which fields a query from engines 112 or 114 (with a TLSH value) and returns a result to those engines. Forest 124 is a collection of clustered known benign files, each represented by a TLSH value and organized into trees. Forest 126 is a collection of clustered known malicious files, each represented by a TLSH value and organized into trees. The TLSH algorithm clusters benign or malicious files, separately, into trees using a K-NN (K Nearest Neighbor) algorithm; using an input TLSH hash value from a suspect file, these trees are then searched looking for similar files. Use of the TLSH algorithm is described in further detail in U.S. Pat. No. 10,162,967 which is hereby incorporated by reference.

FIG. 1B is a system 160 showing an input file to check 140, an endpoint user computer 170 and an output result 190. Accessible over a network connection (such as over the Internet) is a forest service 171 that includes the modules mentioned above. A query 182 is performed by the endpoint computer which submits a TLSH hash value for the input file to determine matches in databases 174 and 176, and a return 184 provides the number of matches and number of items in each cluster back to the endpoint computer as will be discussed in greater detail below. In this embodiment, the service 171 performs checking of the input hash against databases 174 and 176 to determine matches, while similarity, suspiciousness and aggregation is performed on the endpoint computer. Endpoint computer 170 is any suitable user computer such as a desktop, laptop, etc. The computer includes software for implementing the present invention such as a similarity scorer engine 112, a suspiciousness scorer engine 114 and a score aggregator engine 130.

FIG. 1C is a system 161 showing an input file to check 140, an endpoint user computer 170 and an output result 190. Accessible over a network connection (such as over the Internet) is a cloud service 179 that includes query socket server 173. Feature extractor module 191 extracts file features from file 140 as explained below. In this embodiment, system 161 does not use the TLSH algorithm nor a forest service as described above, but extracts different file features such as file static properties, file size, file entropy, and their combinations. These features will then be the basis of clustering and similarity matching. These feature extraction and clustering processes can be accomplished in several ways, by using different open source machine learning libraries. One of which is arguably, the most popular, is Python's "scikit-learn." In this example, benign clusters 175 include clusters of known benign files, each represented by their features, and the clusters may be represented in any suitable data structure preferred by a designer. Similarly, malicious clusters 177 include clusters of known malicious files, each also represented by their features, and the clusters may be represented in any suitable data structure preferred by the designer.

In this example, query 183 is performed by the endpoint computer which submits features for the input file to determine matches in databases 175 and 177, and a return 185 provides the number of matches and number of items in each cluster back to the endpoint computer as will be discussed in greater detail below. In this embodiment, the cloud service 179 performs checking of the input features against databases 175 and 177 to determine matches, while similarity, suspiciousness and aggregation is performed on the endpoint computer. Endpoint computer 170 is any suitable user computer such as a desktop, laptop, etc. The computer includes software for implementing the present invention such as a similarity scorer engine 112, a suspiciousness scorer engine 114 and a score aggregator engine 130. It is also possible that cloud service 179 is implemented wholly within endpoint computer 170.

In yet another embodiment of the invention (not shown) all the modules of the endpoint computers shown in FIGS. 1A, 1B or 1C may be implemented on a cloud service. In this embodiment, the input file 140 (or its digest or its features) is sent directly to the cloud service, where all calculations are performed, and the result is sent back to the endpoint computer is simply an indication as to whether the input file is malicious or benign.

The invention utilizes a modified Tarantula method to provide a suspiciousness score to the applications or files found to be similar. The Tarantula method, as stated above, is a similarity-based localization technique used for automated debugging of program statements during software development. The method makes use of the passed test cases in addition to the failed test cases to assess whether the code in a program statement is bug free or not. For example, Tarantula may flag a statement, which is primarily executed during failed test cases but occasionally executed during passed test cases, as having a software bug. This approach allows for a more accurate prediction of where a bug is located, because in reality, software bugs follow this behavior.

FIG. 2 shows how Tarantula calculates a hue score 210 and then a suspiciousness score 220, where passed(S) is the number of test cases that passed and executed at least once, and failed(S) is the number of test cases that failed and executed at least once. In the case that the denominator is 0, the fraction is assigned a value of 0 instead of undefined. Suspiciousness is then computed as shown. This leads to more intuitive notion of suspiciousness where less suspicious values are closer to 0 and more suspicious values are closer to 1.

FIG. 3 shows how our system calculates a score 230 and then a suspiciousness score 240 using matching of a hash value (or features) for a suspect file. As shown, the variables in the formula are modified, although suspiciousness is still the same. Note that the variable "total of cluster items in the matched benign clusters" or the variable "total of cluster items in the matched malware clusters" refers to the total number of cluster items (i.e., files) in only those clusters in which there is a match with the input file.

As can be seen, clustered data for both good files and malicious files are used in the modified Tarantula formula. These clustered data are expected to be the optimal clustered representations of the benign and malicious files. For the benign clusters, an example of an optimal clustered representation would be clusters containing Windows OS/system files, Microsoft files, and the top 200 popular applications. These files can be easily collected and profiled from GRID, which is Trend Micro's central and largest repository of benign files. Other sources or repositories of benign files are legitimate downloading sites (CNET, Filehippo, Source Forge), legitimate redistribution sites, and other legitimate public FTP sites.

For the malware space, an example of an optimal clustered representation are clusters containing all malware families. These files can also be easily collected in Trend Micro's virus bank, or can be obtained publicly at Virus Total, and from other malware sharing communities. The good thing about these optimal clustered data representations is that they are not fixed, and may be subject to change based on the user and their use cases. For example, users can flexibly use a cluster of Windows files alone and a cluster of Ransomware families alone, as their optimal clustered representations of benign and malicious files, respectively, if they wish to do so.

Fast Search Using a TLSH Forest

The below flows in one embodiment make use of the TLSH Forest and a fast search. The fast search problem can be stated as a type of nearest neighbor search: we have a dataset, D, of items and a similarity or distance measure, for the remainder of the paper we will assume a distance measure Dist(d1; d2); we have a new data item, S, where we want to find dmin, the element of D which is closest to S, that is the element of D which has minimum Dist(dmin; S); and we need to avoid comparing S to all of the elements of D; ideally, we require that we only compare S to a small subset of D, for example to compare S to a logarithmic number of elements.

There are a number of (approximate) nearest neighbor approaches. Special case fast algorithms exist for low dimension and problems with specific geometry. The generalized approaches include (i) Locality Sensitive Hashing (LSH) where the algorithm searches through data points which are mapped onto the same bucket, and (ii) greedy search in proximity neighborhood graphs and (iii) vector approximation files.

The malware problem (and computer security problems in general) requires a general solution. The traditional LSH approach is to rely on bucket collisions to identify near matches. We note that this approach has a significant problem for security, namely an adversary has a target to aim for; once they generate sufficient change to a malicious item to belong to a new bucket, then they may have defeated the search algorithm. Ideally, we want a search algorithm which is not brittle in this way.

Here we present a different approach to the traditional LSH methods. We can build a search tree where we may associate 1 or more items from D at the leaf nodes. Given a new item, we can trace a path down the search tree and compare with the nodes there. Depending on our computational requirements, we can use the search algorithm from Vantage Point trees (with backtrack) to do search guaranteed to find the closest item. Or we can do approximate nearest neighbor search by employing a forest of trees; an advantage of this approach is that we know the computational cost of a lookup which is proportional to the depth of the deepest tree times plus the number of items in the leaves. We describe the algorithm below assuming that the TLSH distance is used, but any appropriate distance measure can be used. TLSH is an approximate distance metric (within a constant of a metric), so it can be employed in a single tree with backtrack, or it can use a forest of search trees (which can be a randomly constructed forest to ensure that they are uncorrelated trees).

FIG. 9 shows tree building Algorithms 1 and 2 used to build normal forest 124 and malware forest 126, i.e., how the TLSH values are organized into a binary tree. We can build such a search tree from a data set D. First of all, we define a SplitMethod as shown in Algorithm 1 which has inputs a node N (where we associate N:data with a subset of D) and outputs (Y; T;X1;X2). If the distance measure has the appropriate characteristics, then we can ensure that the size of X1 and X2 are approximately the same size. We can add an additional requirement that Split Method should only be applied to nodes where the resulting threshold, T, which splits the set into two, should be greater than some parameter. For example, if we find that a node has a T=1, then it is very likely that there is no benefit in splitting N. We can then build a tree by setting root:data=D and calling Tree-Build(root) of Algorithm 2.

Flow Diagrams

Figure 4:
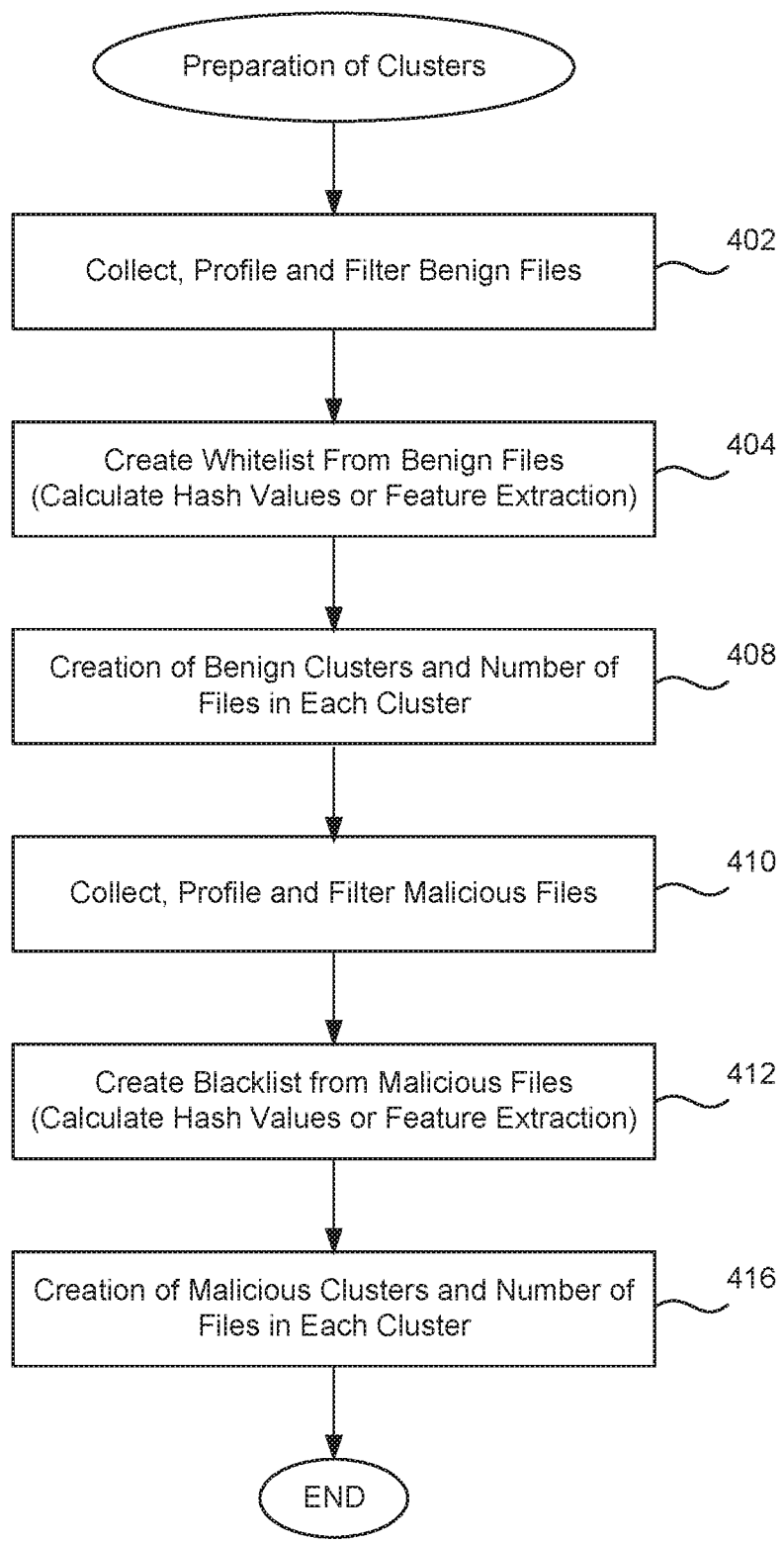
FIG. 4 describes one embodiment in which clusters of benign and malicious files are prepared and stored in the white list and blacklist databases shown in FIGS. 1A, 1B and 1C.

FIG. 4 describes one embodiment in which clusters of benign and malicious files are prepared and stored in the white list and blacklist databases shown in FIGS. 1A, 1B and 1C. In general, two techniques may be used and are described below: use of the TLSH algorithm and the related Forest Service (or other similarity digest), or use of feature extraction (such as using SKLearn).

In a first step 402, an optimal representation of benign files that will be used to create a white list are collected, profiled and filtered. As mentioned above, known benign files that may be used that are optimal would be all system files from the Microsoft operating system (for example), and all known good applications used under that operating system. The files are profiled to make sure that each file is what it purports to be, is known good, and is preferably of a most recent version. In addition, the files may be filtered to remove obvious duplicates or to remove files that are so similar to one another that one of the files is not needed. As stated, optimal representations of benign files may vary, and is based on users' use cases. Other examples of optimal representation of known benign files can be the representation of popular legitimate browser files, or the representation of the most popular productivity tools used.

In a next step 404, a white list representing these benign files is created using one of two techniques. In one embodiment which uses the TLSH algorithm, a hash value is calculated for each file (another similarity digest may also be used), to create a white list of hash values. In a second embodiment, feature engineering is done by creating feature extraction scripts, using different Python libraries. In other words, feature extraction may be used to extract relevant features from each file; preferably, Python has a lot of modules that may be used to perform this feature extraction, depending on the features to be extracted. A good and a popular example of a Python library capable of feature extraction is "python-pefile,"which is capable of extracting features of a Microsoft portable executable (PE) file, such as file headers, image headers, entropies, sections, etc. The result is a white list containing a set of features for each of the benign files.

Creation of benign clusters and determining the number of files in each cluster is performed in step 408. In other words, once the white list needed for producing the optimal clustered representations of benign files is ready from step 404 (using either locality-sensitive hashing or SKLearn), either clustering technology and its associated tools maybe used to cluster files and to produce a cluster model file in step 408. By way of example, SKLearn or TLSH Forest may be used, depending upon which technology was used in step 404.

Using SKLearn, there are several clustering algorithms which may be used (e.g. KMeans, DBScan, Hierarchical clustering, etc). As mentioned above, this software bases its clustering upon the features of each file; by default a predetermined number clusters are determined although the user may customize and choose their own number clusters. In general, files that are more similar to one another will be placed into the same cluster. SKLearn is open source and its technology is known and its tools are readily available to those of skill in the art. Below is sample code for training and dumping a cluster model file in SKLearn.

```
from sklearn.cluster import KMeans
from joblib import dump, load
from sklearn import datasets
X, y=datasets.load_iris(return_X_y=True)
kmeans=KMeans(init='k-means++', n_clusters=11,
    n_init=10)
kmeans.fit(X)
dump(kmeans, 'dumped_model.pk1')
mod=load('dumped_model.pK1')
    mod.predict(new_data)
```

If TLSH Forest and its utilities will be used in step 408, the command below will generate a clout and dt files. The dt file is the actual model file, while the clout file is a reference file containing the details of the clustered data, such as the cluster centers and number of items in each cluster center. The clout file is preferred to be used, since it contains the cluster centers and the number of items in each cluster to compute the score and suspiciousness. In general, this algorithm forms clusters using the K-NN (K Nearest Neighbor) algorithm and forms trees of hash values, each tree representing a particular cluster. By default, ten trees are formed although the user may select a different number. In general, files that are more similar to one another will be placed into the same cluster.

```
search_lsh_tree -cluster<input file with TLSH values>-stc
    1
    -clout<clout_filepath>
    -cldir<directory where clusters are dumped>
    -T 50 -clminsize 10 -dt<dt_filepath>
```

The result after step 408 (for either SKLearn or TLSH) is a number of clusters, each cluster representing a group of benign files and the number of files in each cluster.

In step 410, an optimal representation of malicious files that will be used to create a blacklist are collected, profiled and filtered. As mentioned above, known malicious files that may be used that are optimal would be a collection of malicious files representing all known malware families. For example, Trend Micro's virus bank includes such a selection of files. Other groups of malicious files may be obtained from Virus Total. These files may be profiled and filtered as discussed above in step 402.

Next, in step 412 a blacklist representing these malicious files is created using one of the two techniques. In one embodiment which uses the TLSH algorithm, a hash value is calculated for each file (another similarity digest may also be used), to create a blacklist of hash values. In a second embodiment, feature extraction may be used to extract relevant features from each file; preferably, the open-source SKLearn suite of modules may be used to perform this feature extraction. The result a blacklist containing a set of features for each of the malicious files.

Creation of malicious clusters and determining the number of files in each cluster is performed in step 416. In other words, once the blacklist needed for producing the optimal clustered representations of malicious files is ready from step 404 (using either locality-sensitive hashing or SKLearn), either clustering technology and its associated tools maybe used to cluster files and to produce a cluster model file in step 416. By way of example, Sklearn or TLSH Forest may be used, depending upon which technology was used in step 412.

The result after step 416 (for either SKLearn or TLSH) is a number of clusters, each cluster representing a group of malicious files and the number of files in each cluster. The system is now ready to process input of suspicious files in real time.

Figure 5:
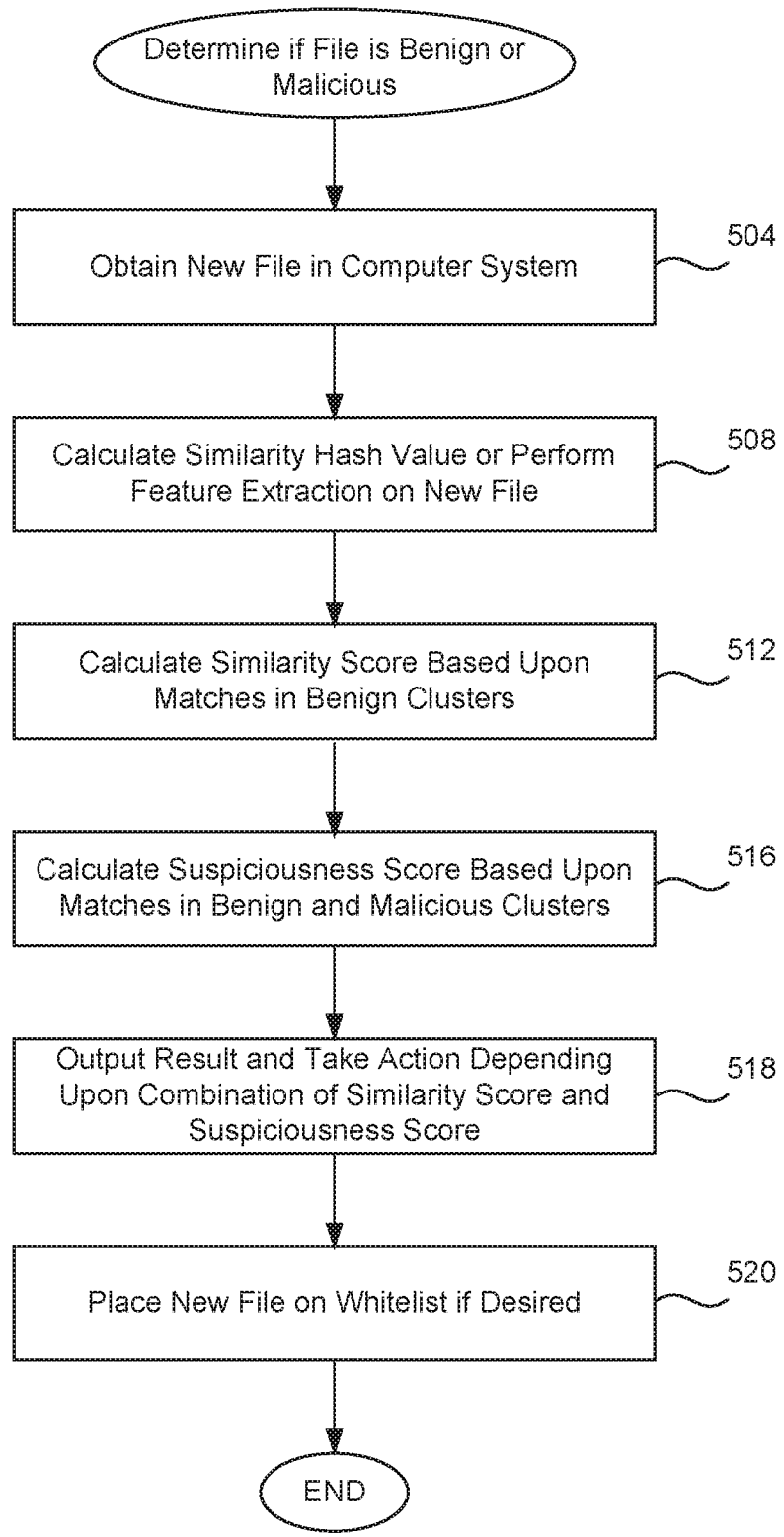
FIG. 5 is a flow diagram describing one embodiment by which it is determined whether an input suspicious file is benign or malicious.

FIG. 5 is a flow diagram describing one embodiment by which it is determined whether an input suspicious file is benign or malicious. In a first step 504 a suspect file, such as file 140 (e.g., a new version of Java.exe), is obtained within endpoint computer 110 or 170. Next, in step 508 the file is processed using either the TLSH algorithm (or other similarity digest) or feature extraction. If TLSH is used, then the similarity hash value is calculated for this file. If feature extraction is used, then Python has a lot of modules that may be used to perform this feature extraction, depending on the features to be extracted. As stated above, a good and a popular example of a Python library capable of feature extraction is "python-pefile,"which is capable of extracting features of a Microsoft portable executable (PE) file, such as file headers, image headers, entropies, sections, etc.

Next, in step 512, the similarity score is calculated based upon matches in any of the benign clusters created in step 408. The algorithm used to calculate a similarity score between two hash values (that were each calculated using a locality-sensitive hashing algorithm) is the approximate hamming distance.

If the embodiment of FIG. 1A is used, then the hash value or relevant features are sent within the endpoint computer via socket server 122. If embodiments of FIG. 1B or 1C are used, then the hash value or relevant features are sent as a query to the service over a network connection. The service returns the similarity score. Using TLSH, the hash value is compared to the tree structures of known good similarity hash values and what is returned is an integer representing a score for each match with a hash value in a cluster representing a known good file. For example, a returned result of (24, 38, 38, 41 and 43) indicates that the hash value of the suspect file has matched five benign files, with a score of 24 indicating a very close match. The returned result also indicates that the total number of files represented in all the clusters where a match was found is equal to six. This matching may be performed as described directly below.

Figure 8:
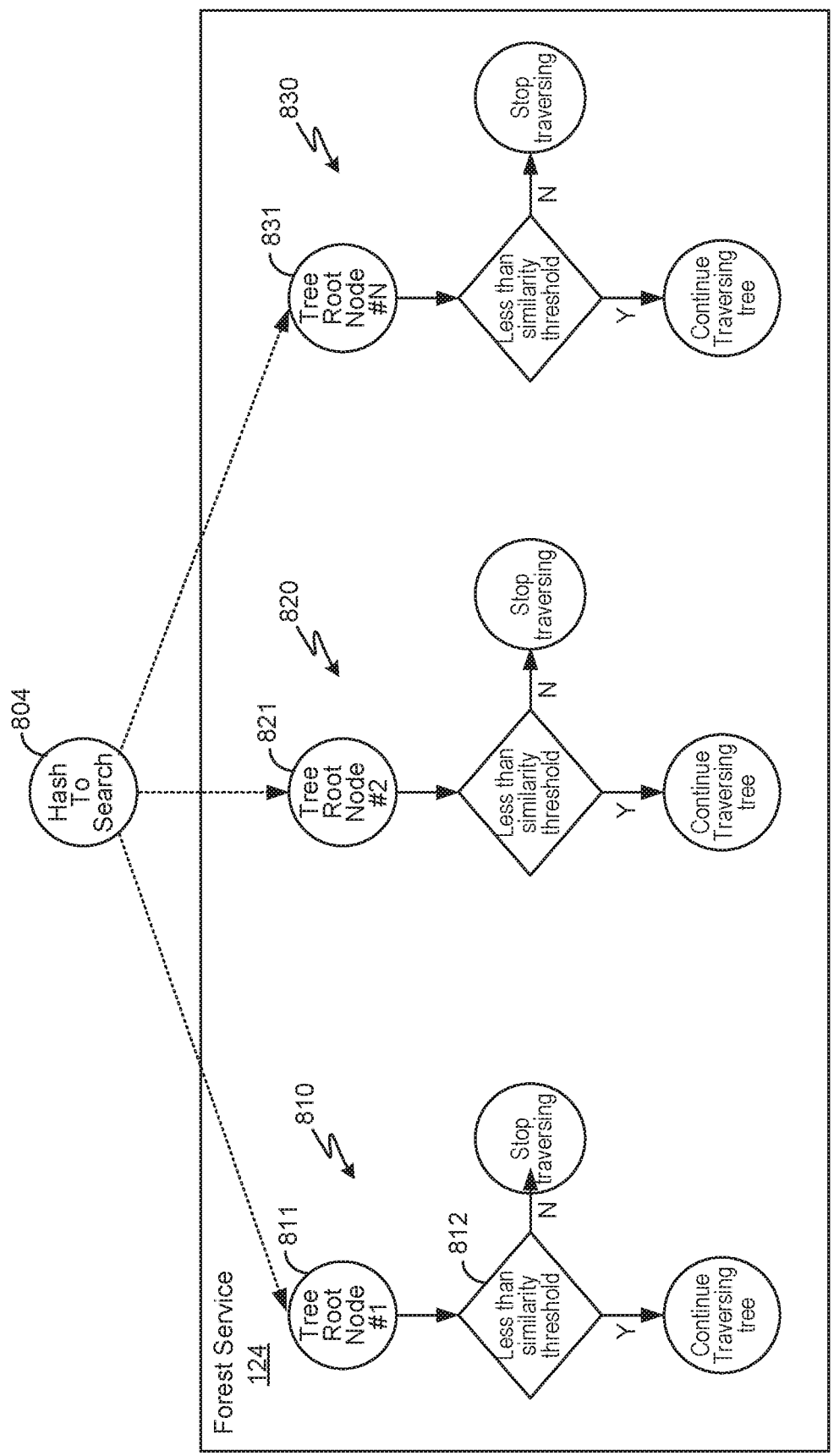
FIG. 8 is a block diagram of one embodiment of how forest service may be implemented.

FIG. 8 is a block diagram of one embodiment of how forest service 124 may be implemented. As mentioned earlier, and as its name implies, forest service 124 is a collection of tree structures, where each node of each tree includes a TLSH value representing one of the benign files (i.e., the "normal forest"). Of course, a similar forest service 126 represents all of the collected malicious files (i.e., the "malware forest"). Although only three tree structures 810, 820 and 830 are shown, by default a benign or malicious forest will include ten tree structures (which may be changed by the administrator). Hash value 804 is the similarity hash value for the suspect file calculated in step 508. Before searching the tree, a similarity threshold (e.g., "30") is identified, perhaps as a default value, predetermined by an administrator, set by a user, etc.

In order to search the trees of forest service 124, the new TLSH value 804 to be searched is compared against the TLSH value in the root nodes 811, 821 and 831. As is known, a similarity algorithm is used to calculate a similarity score between two hash values, where the lower the value the more likely it is that two files are identical. If the score is greater than the similarity threshold 812 for a particular tree, this indicates that hash values of nodes lower in the tree are also likely to be greater than the threshold (i.e., the representative files are not similar to the suspect file) and that particular tree will not be traversed. On the other hand, if the score is less than the similarity threshold then traversing continues down the tree. At the next level of the tree a similarity score is calculated between value 804 and each of the hash values in the nodes at the next level and the comparison shown at 812 is performed again, and so on. Therefore, if there are only ten trees in the forest 124, a first level of searching would only include ten comparisons, in which a similarity score between the TLSH value queried and the TLSH values in the ten root nodes are calculated.

Preferably, all of the root nodes and elements of a tree that are less than or equal to the similarity threshold will be returned as matches for that tree. The similarity score is typically the lowest value. And, each tree of a forest represents a cluster (or group). So, each tree may have one or several matches. Hence, numerous similarity scores may result from a forest in step 512. Thus, the similarity score for the suspect file is 24 which indicates that the file is very likely a benign file.

Alternatively, step 512 may calculate a similarity score for the suspect file by matching its features determined in step 508 with the sets of features in the benign clusters database 175, for example. Again, modules of the SKLearn open-source software may be used to perform this matching and to provide a similarity score. For this machine learning implementation, a similarity score may be equivalent to prediction confidence. Prediction confidence is a probability score (so, 0-1), which indicates the confidence of an entry belonging to a particular cluster.

Below is the same sample snippet code, which will generate the similarity score in the form of a prediction confidence:

from joblib import dump, load
mod=load('dumped_model.pk1')
pred_conf=mod.predict(new_data)
similarity_score=pred_conf Next, in step 516 a suspiciousness score is calculated based upon matches found in both the benign and malicious clusters. If using TLSH, then matches may be determined as discussed above with respect to FIG. 8, where the benign clusters are represented in a forest of trees as shown in FIG. 8 and where the malicious clusters are also represented in a forest of trees. If using SKLearn, then matches using features may also be determined as discussed above. Using as an example the new version of Java.exe (which is a legitimate file), we know that its hash value matched five benign files, and that there were total of six files in all of the clusters in which a matched file was found. In the malicious clusters, we determine that the hash value only matched one malicious file and that there were total of 18 files in the cluster where the malicious file is matched. Therefore, we use the formula as shown in FIG. 3 to calculate a score.

FIG. 6 shows a score calculation 610 based on this example. The result is 0.9375, which subtracted from 1 provides a suspiciousness score of 0.0625. As shown, the suspiciousness score of the new legitimate version of Java.exe is very low, which is expected because of the multiple matches in the benign clusters and only a single match in a malicious cluster with many members. So, intuitively, it can be seen that this low suspiciousness score, combined with the low similarity score, indicates that a user can be confident that this version of Java.exe is benign, can be executed, and may be added to a white list.

Alternatively, if using SKLearn, then matches using features may also be determined as discussed above. Assuming that SKLearn returns matches for the suspect file from the benign and malicious clusters similar to those matches shown in FIG. 6, then the suspiciousness score 620 for this suspect file using feature extraction will also be 0.0625. Thus, this file can also be trusted based upon matching using feature extraction and features.

FIG. 7 shows a score calculation 710 based upon yet another example. In this example, the suspect file is a malicious version of iexplore.exe. When the similarity score is calculated using the TLSH algorithm, the output shows that there was one exact match in a benign cluster that contains 15 files, indicating a similarity score of "zero." Yet, there were four fairly close matches (similarity scores of 0, 15, 17 and 17) in two malicious clusters where there were a total of six items in these two clusters. Again, using the formula of FIG. 3 and plugging in these numbers into formula 710, the numerical score is 0.0909. This results in a suspiciousness score 720 of 0.9091. As seen by this calculation, the suspiciousness of the malicious file iexplore-.exe is quite high and that's understandable as it was seen in two malicious clusters having several matches. Thus, using this high suspiciousness score, the user is justified in overriding a decision that the file is benign and should be placed upon a white list simply because of the single exact similarity match.

In this example of FIG. 7, is also possible that the resulting matches and numbers may be obtained using feature extraction and comparison of features between files using SKLearn modules, rather than using similarity digests.

In step 518 a result 150, 190 is returned and an action taken based upon that result. Typically, this decision is based upon a combination of the similarity score and the suspiciousness score, for example, as has been described above. In addition, in combining the results of the similarity and suspiciousness score to come up with a whitelist decision, the following schemes (among others) may be used.

In a first example, the logic is based on a threshold of each of the similarity and suspiciousness scores. For the example computations above, the below simple logic may be used.

```
if (similarity_score<=30 and similarity_score>=0)
   and suspiciousness_score<=0.20:
    whitelist=True
else: whitelist=False
```

In a second example, standard averaging plus a threshold is used. In this scheme a 50-50 weight is given to both similarity and suspiciousness scores. In addition, since for both scores, the lower is better, a threshold average score of below 100 is also defined. The threshold should be below 100 because the suspiciousness score range is from 0 to 1, so we put it in a scale of 100 (or in a percentage). Preferably, 100 is an optimal similarity score threshold. Thus, using this scheme in the two example computations above, and setting the average score threshold to 30 or below to be whitelisted, we have:

$1^{st}$ example=(24+6.25)/2=15.125→whitelisted $2^{nd}$ example=(0+90.91)/2=45.455→not whitelisted In a third example, we use a weighted average plus a threshold. This technique is similar to standard averaging. The difference is that different weights are defined and given to the similarity and suspiciousness scores. And again, a threshold weighted average score is defined.

Therefore, any of a variety of techniques may be used to combine the similarity score with the suspiciousness score in order to determine whether or not the suspect file is benign or malicious. If the invention is being implemented for application control purposes, the action may be to execute the file if it is benign, while the action might be to not execute the file (or remove it, place it in quarantine, alert a user or administrator, etc.) if the file is determined to be malicious.

In step 520 it is determined whether or not to place the new file on the whitelist. This action may be taken if an applicable use case is to update a white list database. If the new file has been determined to be benign in step 518 then a representation of the new file may be placed into database 124, 174 or 175, using for example, its TLSH hash value, other similarity digest, or it extracted features (using SKLearn), as the case may be. If the file has been determined to be malicious, then it is not placed into any white list.

Computer System Embodiment

Figure 10A:
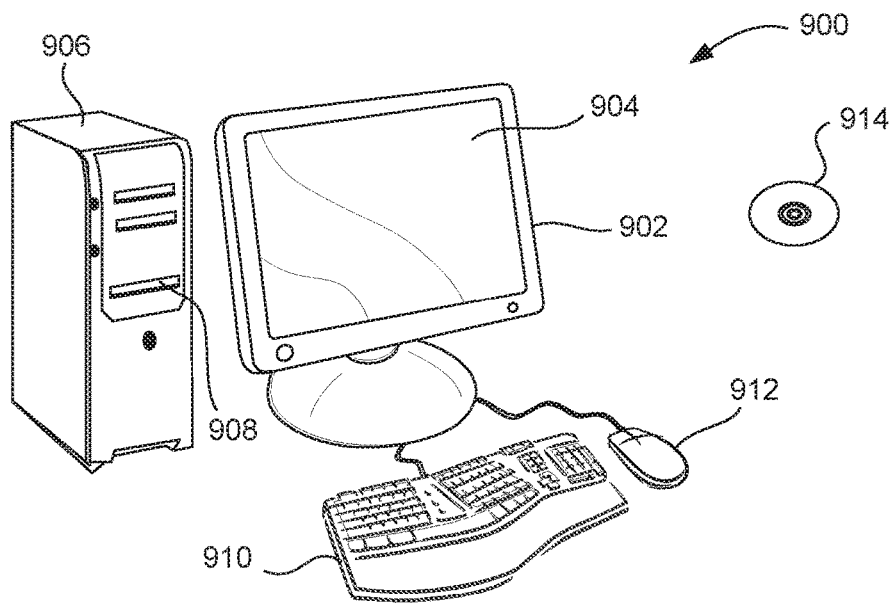
FIGS. 10A and 10B illustrate a computer system suitable for implementing embodiments of the present invention.
Figure 10B:
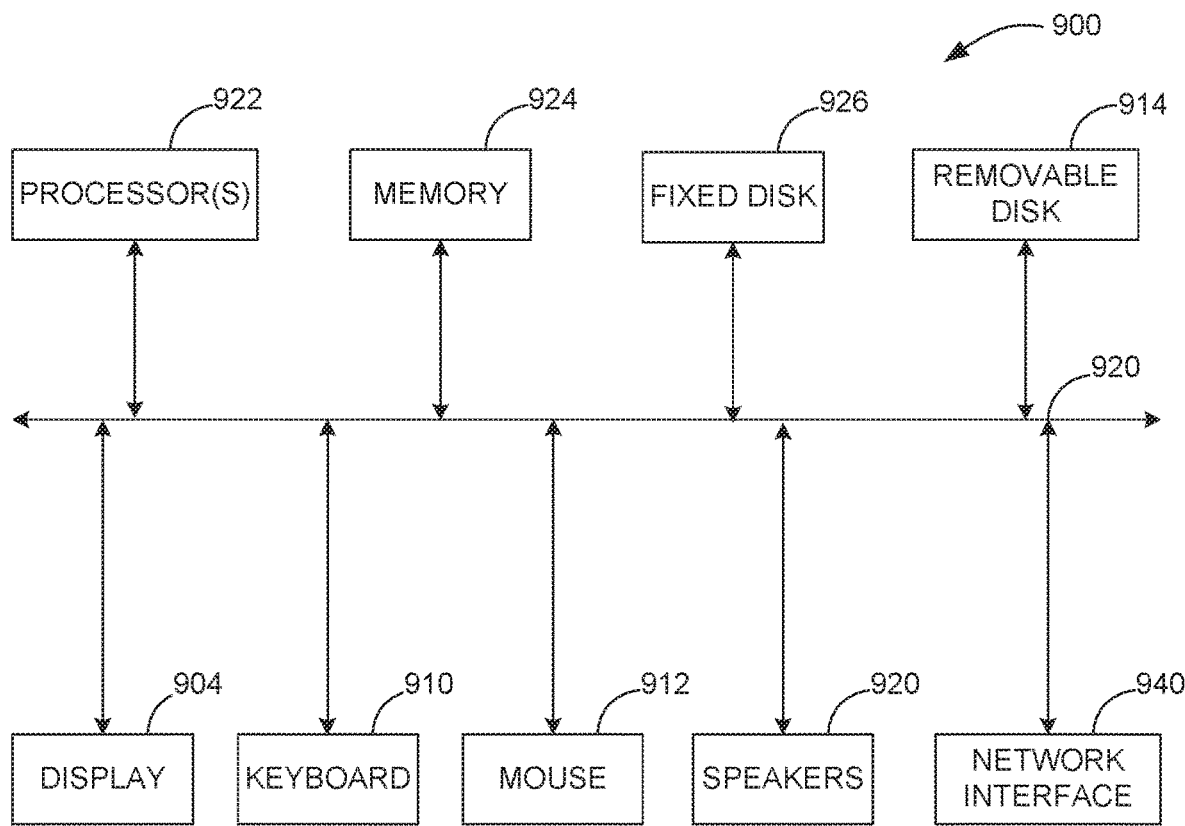

FIGS. 10A and 10B illustrate a computer system 900 suitable for implementing embodiments of the present invention. FIG. 10A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps.

Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of determining that a computer file is benign, said method comprising:
    receiving a suspect computer file in an endpoint computer;
    calculating a suspect hash value of said suspect file using a locality-sensitive hashing algorithm;
    traversing a plurality of tree structure of hash values of known benign computer files while calculating a score between said suspect hash value and each of a plurality of said hash values and determining that a plurality of said scores are matches, each of said tree structures being a cluster of a plurality of said known benign computer files that are similar to one another;
    selecting a similarity score based upon said matches between said suspect hash value and said plurality of hash values of said known benign computer files, wherein said hash values being calculated using said locality-sensitive hashing algorithm;
    calculating a suspiciousness score that depends upon a) a number of matches between said suspect hash value and hash values in said cluster of known benign computer files and b) a number of matches between said suspect hash value and hash values in the cluster of known malicious computer files, wherein said hash values of said known benign computer files and of said known malicious computer files being calculated using said locality-sensitive hashing algorithm; and
    determining that said suspect file is benign based upon a combination of said similarity score and said suspiciousness score.

2. A method as recited in claim 1 further comprising:
    executing said suspect file in said endpoint computer only after determining that said suspect file is benign.

3. A method as recited in claim 1 further comprising:
    adding said suspect file to a white list used by said endpoint computer.

4. A method as recited in claim 1 wherein the greater said suspiciousness score the more likely that said suspect file is not benign.

5. A method as recited in claim 1 wherein said locality-sensitive hashing algorithm is the TLSH algorithm.

6. A method as recited in claim 1 wherein said cluster of known benign files and said cluster of known malicious files reside at a cloud service, said method further comprising:
    sending said suspect hash value from said endpoint computer over a network connection to said cloud service for comparison with said cluster of known benign files and said cluster of known malicious files.

7. A method as recited in claim 1 wherein said suspiciousness score also depends upon a total number of files represented in said cluster of known benign files and a total number of files represented in said cluster of known malicious files.

8. A method as recited in claim 1 wherein said similarity score indicates that said suspect computer file is benign and said suspiciousness score indicates that said suspect computer file is malicious, said method further comprising:
    determining that said suspect computer file is benign even though said suspiciousness score indicates that said suspect computer file is malicious.

9. A method of determining that a computer file is malicious, said method comprising:
    receiving a suspect computer file in an endpoint computer;
    calculating a suspect hash value of said suspect file using a locality-sensitive hashing algorithm;
    traversing a plurality of tree structure of hash values of known benign computer files while calculating a score between said suspect hash value and each of a plurality of said hash values and determining that a plurality of said scores are matches, each of said tree structures being a cluster of a plurality of said known benign computer files that are similar to one another;
    selecting a similarity score based upon said matches between said suspect hash value and said plurality of hash values of said known benign computer files, wherein said hash values being calculated using said locality-sensitive hashing algorithm;
    calculating a suspiciousness score that depends upon a) a number of matches between said suspect hash value and hash values in said cluster of known benign computer files and b) a number of matches between said suspect hash value and hash values in the cluster of known malicious computer files, wherein said hash values of said known benign computer files and of said known malicious computer files being calculated using said locality-sensitive hashing algorithm; and
    determining that said suspect file is malicious based upon a combination of said similarity score and said suspiciousness score.

10. A method as recited in claim 9 further comprising:
    not executing said suspect file in said endpoint computer after determining that said suspect file is malicious.

11. A method as recited in claim 9 further comprising:
    removing said suspect file from said endpoint computer.

12. A method as recited in claim 9 wherein the greater said suspiciousness score the more likely that said suspect file is not benign.

13. A method as recited in claim 9 wherein said locality-sensitive hashing algorithm is the TLSH algorithm.

14. A method as recited in claim 9 wherein said cluster of known benign files said cluster of known malicious files reside at a cloud service, said method further comprising:
sending said suspect hash value from said endpoint computer over a network connection to said cloud service for comparison with said cluster of known benign files and said cluster of known malicious files.

15. A method as recited in claim 9 wherein said suspiciousness score also depends upon a total number of files represented in said cluster of known benign files and a total number of files represented in said cluster of known malicious files.

16. A method as recited in claim 9 wherein said similarity score indicates that said suspect computer file is benign and said suspiciousness score indicates that said suspect computer file is malicious, said method further comprising:
determining that said suspect computer file is malicious even though said similarity score indicates that said suspect computer file is benign.

17. A method of determining that a computer file is malicious, said method comprising:
receiving a suspect computer file in an endpoint computer;
extracting features from said suspect file to obtain a set of suspect file features using a machine learning feature extraction algorithm;
comparing said suspect file features to clusters of sets of file features of known benign computer files and calculating a score between said suspect file features and each of a plurality of said sets of file features and determining that a plurality of said scores are matches, wherein said clusters of sets of file features of known benign computer files each include sets of file features that are similar to one another;
selecting a similarity score based upon said matches between said suspect file features and said sets of file features of said known benign computer files, wherein said sets of file features being calculated using said feature extraction algorithm;
calculating a suspiciousness score that depends upon a) a number of matches between said suspect file features and sets of file features in said cluster of known benign computer files and b) a number of matches between said suspect file features and sets of file features in said cluster of known malicious computer files, wherein said sets of file features of said known benign computer files and of said known malicious computer files being calculated using said feature extraction algorithm; and
determining that said suspect file is malicious based upon a combination of said similarity score and said suspiciousness score.

18. A method as recited in claim 17 further comprising:
executing said suspect file in said endpoint computer only after determining that said suspect file is benign.

19. A method as recited in claim 17 further comprising:
adding said suspect file to a white list used by said endpoint computer.

20. A method as recited in claim 17 wherein said suspiciousness score also depends upon a total number of files represented in said cluster of known benign files and a total number of files represented in said cluster of known malicious files.

21. A method as recited in claim 17 wherein said similarity score indicates that said suspect computer file is benign and said suspiciousness score indicates that said suspect computer file is malicious, said method further comprising:
determining that said suspect computer file is malicious even though said similarity score indicates that said suspect computer file is benign.

\* \* \* \* \*